United States Patent [19]

Beaver, Jr.

[11] 4,242,855
[45] Jan. 6, 1981

[54] LAWN MOWER AUXILIARY UNIT WITH FLEXIBLE DRIVE SHAFT

[76] Inventor: B. Max Beaver, Jr., 3145 Merrick La., #2B, Indianapolis, Ind. 46222

[21] Appl. No.: 13,883

[22] Filed: Feb. 22, 1979

[51] Int. Cl.³ ............................................ A01D 35/26
[52] U.S. Cl. ................................... 56/13.7; 56/11.8; 56/16.8; 56/16.9
[58] Field of Search .............. 56/16.9, 13.7, 13.8, 56/16.8, 12.7, 11.8

[56] References Cited
U.S. PATENT DOCUMENTS

| | | | |
|---|---|---|---|
| 2,790,292 | 4/1957 | Trecker | 56/16.9 |
| 2,888,084 | 5/1959 | Trecker | 56/13.7 |
| 3,604,208 | 9/1971 | Borunda | 56/13.7 |
| 3,789,591 | 2/1974 | Emery | 56/16.9 |
| 3,857,515 | 12/1974 | Zennie | 56/16.8 |
| 4,170,099 | 10/1979 | Owens | 56/13.6 |

*Primary Examiner*—Jay N. Eskovitz
*Attorney, Agent, or Firm*—Woodard, Weikart, Emhardt & Naughton

[57] ABSTRACT

An edge trimmer mounted as auxiliary equipment on a rotary lawn mower. A flexible drive shaft has a first end connected to the top end of the lawn mower engine crankshaft. The opposite end of the flexible shaft is connected to a rotatable input driver of a trimmer. A rotatable cutting head on the trimmer is connectable to the flexible drive shaft by the rotatable input driver. The trimmer is mounted on the lawn mower and may be removed therefrom while connected to the engine crankshaft to facilitate trimming of grass at a location away from the lawn mower. A compressor and reservoir tank is mounted to the lawn mower and may be powered by the flexible drive shaft for spraying insecticide or other liquid.

5 Claims, 4 Drawing Figures

LAWN MOWER AUXILIARY UNIT WITH FLEXIBLE DRIVE SHAFT

BACKGROUND OF THE INVENTION

This invention is in the field of rotary lawn mowers and particularly rotary lawn mowers with auxiliary power units. Lawn mowers have been designed for the cutting of long stretches of lawn; however, additional tools, such as trimmers, are required for trimming the grass around trees, rocks and other objects as well as along the edge of a sidewalk or other pavement. Thus, once the lawn is cut with a lawn mower, it is necessary to obtain and use another tool for the final trimming of the lawn. Attempts have been made at designing a combined lawn mower and trimmer thereby allowing the operator to trim the lawn without the necessity of obtaining a separate tool located remotely from the lawn mower. For example, trimmer attachments for lawn mowers are shown in the U.S. Pat. Nos. 3,192,693, 3,665,691 and 3,197,950. The attachments are typically connected to the bottom end of the lawn mower crankshaft by a pulley/belt combination or various types of gears and levers. The attachements typically have to be installed on the lawn mower during the original manufacture of the lawn mower due to the relatively complex connection with the crankshaft bottom end. A more recent combined lawn mower is shown in U.S. Pat. No. 3,690,384 which likewise includes a rear-mounted edger powered through a belt/pulley combination connected to the bottom end of the lawn mower crankshaft. A side-mounted edger is disclosed in U.S. Pat. No. 2,691,264 which is powered by a series of gears driven by an engine. All of the aforementioned devices do not allow the operator to trim the grass at a location away from the lawn mower. In other words, the prior devices include trimmers which are mounted to the lawn mower and as a result the lawn mower must be pushed around the tree or other such object. In many cases, sufficient space is not available to allow movement of the lawn mower around the object. It is therefore desirable to provide a trimmer which is powered by the lawn mower engine but which may be moved away from the lawn mower a sufficient distance to allow trimming without requiring movement of the lawn mower. In addition, it is desirable to power the auxiliary trimmer by the lawn mower engine in such a manner that the trimmer may be added onto the lawn mower other than at the time of original manufacture. Disclosed herein is an auxiliary trimmer which fulfills both of the aforementioned objectives.

In addition to providing an auxiliary trimmer for a lawn mower, it is desirable to provide a spray unit powered by the lawn mower which may be used for spraying insecticides, fertilizers and the like. Auxiliary spray units mounted to lawn mowers are disclosed in the U.S. Pat. Nos. 3,081,004 and 3,247,655. It is desirable to provide a drive system which can be used to power not only the previously mentioned trimmers but also the spray units without requiring a separate drive unit for the spray unit and trimmer. Disclosed herein is such a drive system.

SUMMARY OF THE INVENTION

One embodiment of the present invention is a rotary lawn mower with auxiliary unit comprising a lawn mower main frame with wheels to move across a lawn, an engine mounted on the frame having a rotatable drive means with a top end extending upwardly from the engine and a bottom end extending downwardly beneath the engine, a cutting head mounted to the bottom end and being rotatable therewith about an axis of rotation perpendicular to a cutting plane with the cutting head including cutting elements extending outwardly therefrom in the plane for cutting vegetation beneath the main frame, an auxiliary frame sized to be moved away from the main frame with the auxiliary frame having an output means of power and a rotatable input driver, a flexible shaft with one end connected to the top end and an opposite end connected to the driver, the shaft being rotatable by the means of the engine to rotate the driver.

Another embodiment of the present invention is an auxiliary unit for use with a rotary lawn mower having an upwardly extending crankshaft with an externally threaded top end comprising a crankshaft adaptor with an internally threaded main body securable to the lawn mower crankshaft top end with the adaptor including retaining means thereon, a flexible rotatable drive shaft with a first end and second end, a first rigid extension mounted on the first end and mountingly received by the retaining means, an auxiliary frame sized to be movable from the lawn mower with the auxiliary frame including a rotatable input driver, and a second rigid extension mounted on the second end and mountingly received by the rotatable input driver.

It is an object of the present invention to provide a lawn mower with auxiliary trimmer which is powered by the lawn mower and which may be operated at a location away from the lawn mower.

A further object of the present invention is to provide a lawn mower having an auxiliary trimmer and spray unit which may be powered by the same drive means.

Yet another object of the present invention is to provide an auxiliary trimmer and spray unit which may be added onto an existing lawn mower in a relatively easy manner.

Further objects and advantages of the present invention will be apparent from the following description.

DESCRIPTION OF THE PREFERRED EMBODIMENTS

Figure 1:
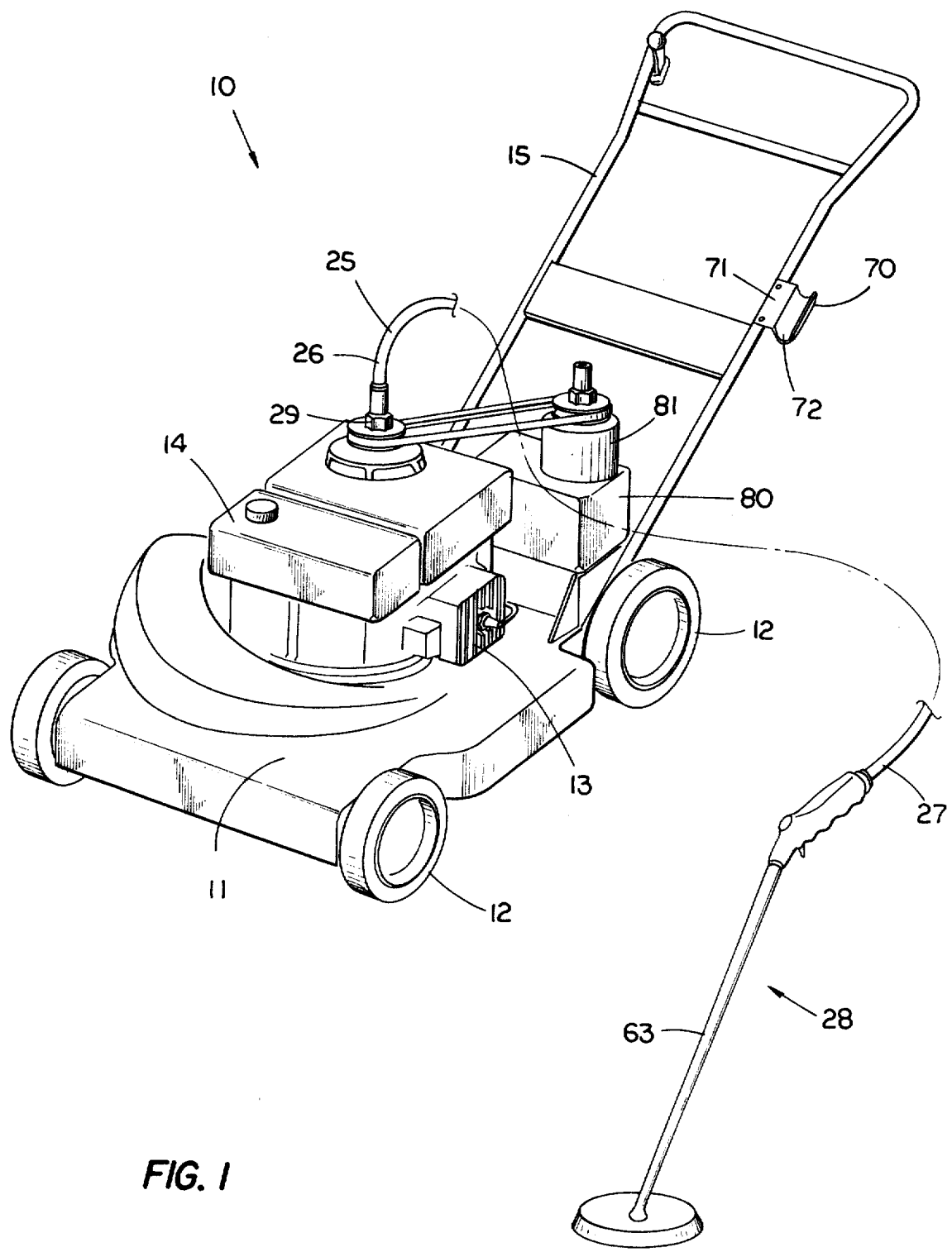
FIG. 1 is a fragmentary perspective view of a lawn mower incorporating the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
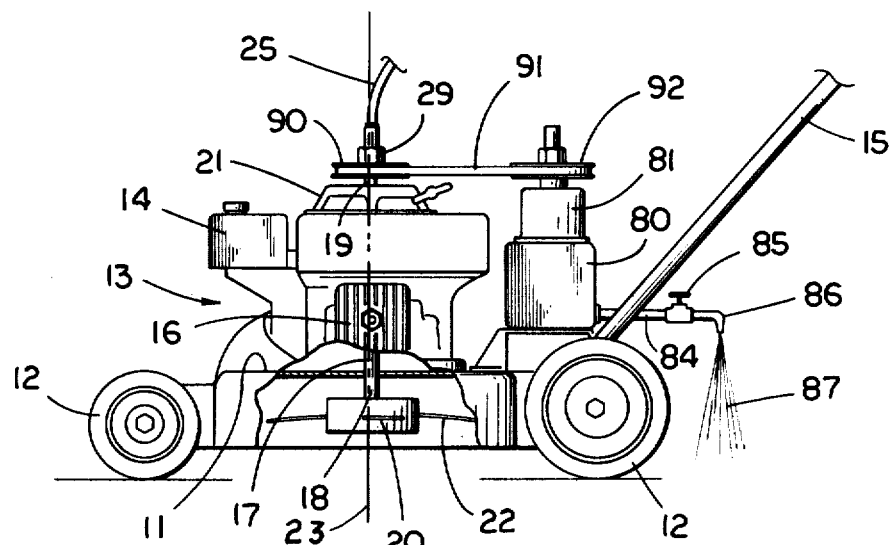
FIG. 2 is a fragmentary side view of the lawn mower of FIG. 1.

Referring now more particularly to FIG. 1, there is shown a rotary lawn mower 10 having a main frame 11 with four wheels 12 rotatably mounted thereon to allow the lawn mower to be pushed or driven across a lawn. Mounted atop frame 11 is a conventional engine 13 which may be of the internal combustion or electric type. Engine 13 may be supplied with a fuel reservoir 14 and a handle 15 extending upwardly therefrom. Engine 13 includes an engine block 16 (FIG. 2) with a rotatable crankshaft 17 mounted thereto. In conventional lawn mower internal combustion engines, drive shaft 17 has a bottom end 18 extending downwardly beneath frame 11 and a top end 19 extending upwardly above the engine block. Typically, the bottom end 18 of crankshaft 17 is connected to the rotatable cutting head 20 whereas the top end 19 is connected to a pulley/rope combination to allow the operator to start the engine by pulling the rope and cranking the shaft 17.

Cutting head 20 includes a plurality of outwardly extending cutting elements 22 which are rotatable with head 20 about an axis of rotation 23 perpendicular to the lawn or cutting plane. Cutting elements 22 extend parallel with the lawn or cutting plane and may be of conventional design either of the rigid metallic blade type or the nonmetallic string or line type of cutter such as disclosed in U.S. Pat. No. 3,859,776 of inventors George C. Ballas and Thomas N. Geist which is incorporated herein by reference. Other U.S. Patents which disclose the line or string-type cutter are U.S. Pat. Nos. 3,708,967 and 3,826,068 which likewise are incorporated herein by reference for purposes of disclosing a cutting head including a nonmetallic cutting line extending outwardly therefrom wherein the line is substantially limp and nonself-supporting in the static condition.

The present invention includes the auxiliary drive means 25 which has its opposite ends 26 and 27 connected respectively to the top end of the lawn mower drive shaft 17 and the input driver of the auxiliary unit such as trimmer 28. Auxiliary drive means 25 (FIG. 3) includes a flexible shaft 30 rotatably mounted within a flexible but nonrotatable outer housing 31. A pair of collars 32 and 33 are fixedly attached to the opposite ends of housing 31 whereas a pair of rigid extensions 34 and 35 are attached to the opposite ends of the flexible rotatable shaft 30. Thus, rotation of extension 34 results in the rotation of flexible cable 30 and its opposite extension 35 with collars 32 and 33 and housing 31 remaining in a nonrotating condition. Flexible shaft 30 and housing 31 are conventional in design and may be designed similarly to the typical speedometer cable used in various vehicles. The shaft and housing are shown as fragmented in FIG. 3 in order to show more clearly flexible shaft 30 which may be configured, for example, as a cable. Both housing 31 and cable 30 are flexible to allow the operator to move the auxiliary drive means in a variety of positions and distances from the lawn mower.

Crankshaft adaptor 29 (FIGS. 2 and 3) is provided to attach end 26 of the auxiliary drive means 25 to the top end of crankshaft 17. Adaptor 29 has a cylindrical main body 36 with a hexagonally shaped end 37 integrally attached thereto. End 37 is provided with an internally threaded passage 38 which threadedly receives the externally threaded top end 19 of crankshaft 17. Thus, in order to use the present invention with conventional lawn mowers, adaptor 29 is first threaded onto the top end of the engine crankshaft 17. Next, extension 34 of the auxiliary drive means is slipped into a locking channel 39 provided in the opposite end of adaptor 29. In the embodiment shown in FIG. 3, channel 39 is provided with a square cross section so as to complementarily receive the extension 34 also provided with a square cross section. A retaining clip 40 has a first end 41 fixedly mounted to the cylindrical main body 36 with the opposite end 42 projecting into channel 39 and engaging groove 43 provided in at least one of the side surfaces of extension 34. Thus, clip 40 provides a means for releasably locking extension 34 to adaptor 29. It will be noted that the axis of rotation 23 (FIG. 2) extends centrally through cutting head 20, crankshaft 17 and adaptor 29.

Figure 4:
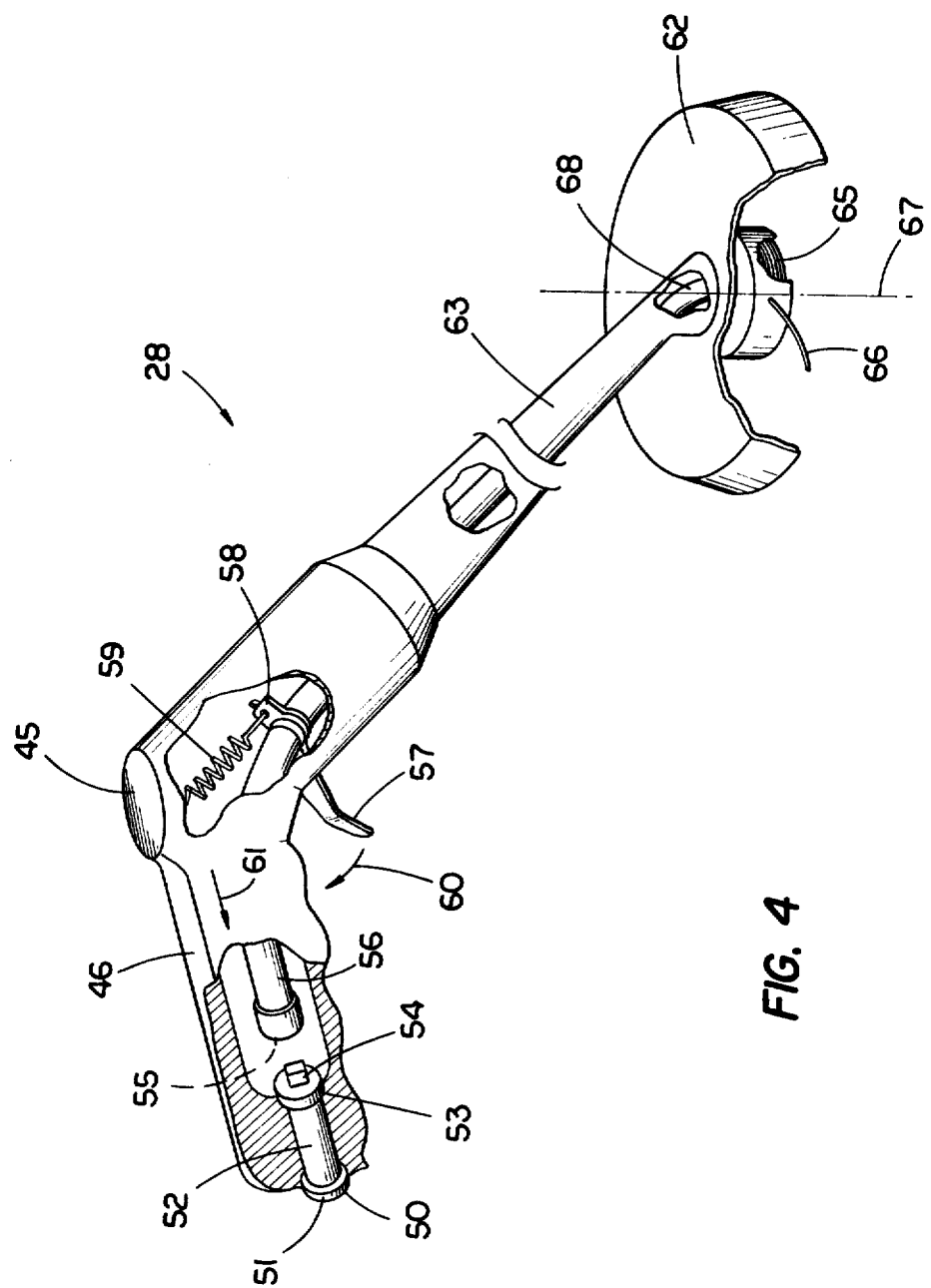
FIG. 4 is a fragmentary enlarged perspective view of the trimmer connected to the lawn mower shown in FIG. 1.

Trimmer 28 (FIG. 4) includes an L-shaped configured main body 45 with a grip 46 provided at one end of the main body and with the actual cutting elements provided in the opposite end. Handle 46 is fragmented to illustrate the positioning of the rotatable driver 50 in the end of handle 46. Driver 50 includes a stem 52 with opposite washer-shaped ends 51 and 53 integrally attached to the stem. Washer end 51 is in abutting relationship to the end of handle 46 with the entire drive 50 being rotatably mounted within the handle. The inner end 54 of driver 50 has a square cross section for fitting within a complementarily sized socket 55 of a second flexible drive shaft 56 rotatably mounted within trimmer 45. Washer 51 and stem 52 are provided with a square cross-sectioned channel for receiving extension 35. A clutch trigger 57 is pivotally mounted to trimmer 45 having an inner end 58 attached to a conventional helical spring 59 for biasing trigger 57 and flexible drive shaft 56 in the position shown in FIG. 4. By pivoting trigger 57 in the direction of arrow 60, flexible drive shaft 56 is caused to move in the direction of arrow 61 so as to engage socket 55 with end 54 of driver 50. Assuming retainer 35 has been previously inserted into stem 52, the lawn mower may be started so as to cause flexible drive shaft 30 to rotate along with driver 50. Thus, by pivoting trigger 57, the flexible drive shaft 56 will engage driver 50 causing the second flexible drive shaft 56 to rotate. The opposite end 68 of flexible drive shaft 56 is connected to rotatable cutting head housed within shield 62 attached to arm 63 of trimmer 45. Flexible drive shaft 56 extends from driver 50 through arm 63 to the rotatable cutter head. A retaining clip similar to clip 40 may be provided on end 51 of driver 50 for retaining extension 35 within the handle drive socket of trimmer 45. The cutting head 47 houses a spool 65 of nylon line with one end 66 of spool 65 extending outwardly to the outer periphery of shield 62. Thus, rotation of flexible shaft 56 will result in the rotation of the cutting head along with spool 65 and the nylon thread about an axis of rotation 67. Alternatively, a plurality of cutting lines may extend outwardly from the cutting head in a manner identical to the cutting head disclosed in U.S. Pat. No. 3,859,776 issued to George C. Ballas and Thomas N. Geist which is herein incorporated by reference for the purpose of the disclosure relating to the cutting head and cutting lines.

It will be apparent from the above description that trimmer 45 provides an auxiliary frame which is sized along with the auxiliary drive means 25 to allow movement of the trimmer away from the lawn mower main frame with the trimmer having an output means of power, namely the end of flexible and rotatable drive shaft 56 attached to the cutting head. The cutting head includes a nonmetallic cutting line 66 which is extendable outwardly therefrom to cut and trim the grass. The cutting line or nylon line is substantially limp and non-self-supporting in a static condition but is sufficiently rigid to cut grass when the cutting head is rotated about axis 67. Bracket 70 (FIG. 1) is mounted to handle 15 of the lawn mower to holdingly and releasably engage the trimmer. In one embodiment, bracket 70 included a flat end 71 riveted to handle 15 and a U-shaped outer end 72 sized to releasably hold arm 63 of the trimmer.

In many cases, it is desirable to spray insecticide, fertilizers and the like onto the lawn. Thus, a tank 80 is mounted to the lawn mower frame immediately adjacent the mounting of handle 15 to frame 11. Mounted atop tank 80 is a conventional compressor 81 for building sufficient pressure within tank 80 to force the insecticide, fertilizer or other liquid within the tank outwardly through tubing 84 to nozzle 86 providing spray 87 mounted at the aft end of the lawn mower immediately behind the lawn mower rear wheels. A conventional valve 85 is provided on tubing 84 to control or restrict the flow of fluid through the tubing. A rotatable input driver is provided at the top end of compressor 81 and is connectable to the top end of the lawn mower crankshaft 17 by either a belt/pulley combination or by the auxiliary drive means including the flexible cable. In the embodiment shown in FIG. 2, a pulley wheel 90 is mounted to the top end of crank shaft 17 immediately beneath adaptor 29. A continuous belt 91 is engaged with pulley wheel 90 and with a second pulley wheel 92 mounted to the top end of the rotatable driver of compressor 81. Pulley wheel 92 is provided with a socket for receiving extension 35 of auxiliary drive means 25 with the opposite end of the auxiliary drive means 25 being inserted into adaptor 29. The auxiliary drive means 25 is connected to the rotatable driver of compressor 81 in case the continuous belt 91 is not utilized. Thus, two different embodiments are provided to drive the compressor with the first embodiment being the pulley wheel and belt combination shown in FIG. 2 and with the second embodiment being the use of the auxiliary drive means 25 in lieu of the belt and pulley wheel combination.

The typical rpm of a lawn mower crankshaft is in the order of 3,400 to 3,700 revolutions per minute. In certain cases, it may be desirable to increase the rpm of the cutting head to approximately 8,000 revolutions and thus suitable multiplying gears may be employed between the end 54 of driver 50 and flexible shaft 56.

Figure 3:
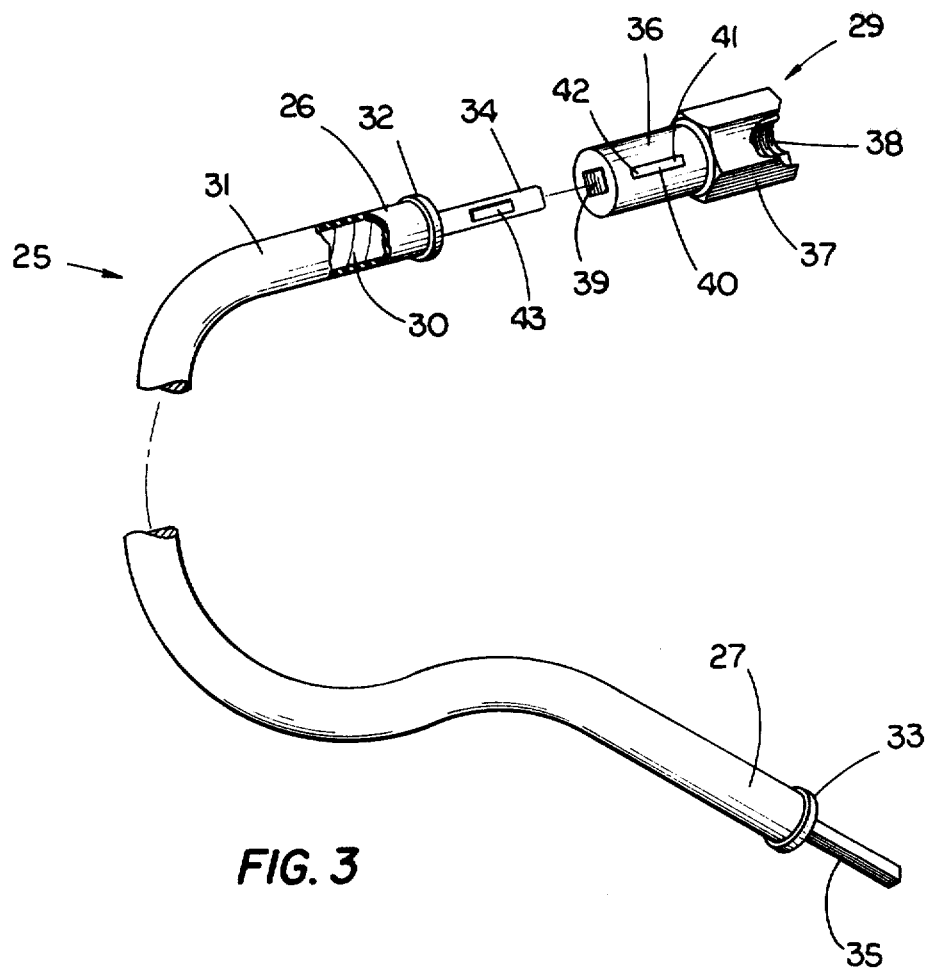
FIG. 3 is an enlarged perspective view of the flexible drive shaft and adaptor connected to the top end of the lawn mower engine crankshaft.

In conventional rotary lawn mowers, the top end of the lawn mower engine crankshaft extends through a flywheel 21 or pulley wheel upon which the crank rope is wrapped. The flywheel is then secured to the crankshaft by means of a crankshaft nut. The nut may be removed and replaced with the adaptor 29 (FIG. 3). Adaptor 29 therefore serves a dual purpose of securing the flywheel to the engine crankshaft while providing a means for connecting the auxiliary drive means to the crankshaft.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. A rotary lawn mower with auxiliary unit comprising:

a lawn mower main frame with wheels to move across a lawn;

an engine mounted on said frame having a rotatable drive means with a top end extending upwardly from said engine and a bottom end extending downwardly beneath said engine;

a cutting head mounted to said bottom end and being rotatable therewith about an axis of rotation perpendicular to a cutting plane with said cutting head including cutting elements extending outwardly therefrom in said plane for cutting vegetation beneath said main frame;

an auxiliary frame sized to be moved away from said main frame with said auxiliary frame having an output means of power and a rotatable input driver;

a flexible shaft with one end connected to said top end and an opposite end connected to said driver, said shaft being rotatable by said drive means of said engine to rotate said driver;

a rigid extension mounted to said opposite end of said flexible shaft and mountingly received by said driver;

clutch means on said auxiliary frame operable to connect and disconnect said output means of power to said flexible shaft;

a flexible nonrotatable housing in which said flexible shaft rotates and extends from said one end to said opposite end of said flexible shaft and wherein said rotatable drive means is a crankshaft of said engine;

a grass edge trimmer mounted on said auxiliary frame and connected to said output means of power, said trimmer including a rotatable cutting head with a nonmetallic cutting line extendable outwardly therefrom to cut and trim grass, said line is substantially and nonself-supporting in a static condition and an adaptor removably connecting said one end of said flexible shaft to said rotatable drive means, said adaptor including a main body with an internally threaded end portion removably threaded onto said top end of said rotatable drive means and an opposite end releaseably connected to said one end of said flexible shaft.

2. The rotary lawn mower of claim 1 wherein said adaptor includes release means thereon engageable with said one end of said flexible shaft.

3. The rotary lawn mower of claim 2 wherein said opposite end of said adaptor includes a channel complementarily receiving said one end of said flexible shaft with said one end including a groove thereon and with said release means including a clip on said main body projecting into said channel and into said groove of said one end.

4. The rotary lawn mower of claim 3 wherein said auxiliary frame includes a flexible drive shaft with a first end connected to said output means of power and a second end removably engageable with said rigid extension of said flexible shaft by said clutch means, said clutch means is operable to move said flexible drive shaft to and from said flexible shaft.

5. A rotary lawn mower with auxiliary unit comprising:

a lawn mower main frame with wheels to move across a lawn;

an engine mounted on said frame having a rotatable drive means with a top end extending upwardly from said engine and a bottom end extending downwardly beneath said engine;

a cutting head mounted to said bottom end and being rotatable therewith about an axis of rotation perpendicular to a cutting plane with said cutting head including cutting elements extending outwardly therefrom in said plane for cutting vegetation beneath said main frame;

an auxiliary frame sized to be moved away from said main frame with said auxiliary frame having an output means of power and a rotatable input driver;

a flexible shaft with one end connected to said top end and an opposite end connected to said driver, said shaft being rotatable by said drive means of said engine to rotate said driver;

a rigid extension mounted to said opposite end of said flexible shaft and mountingly received by said driver;

clutch means on said auxiliary frame operable to connect and disconnect said output means of power to said flexible shaft;

a flexible nonrotatable housing in which said flexible shaft rotates and extends from said one end to said opposite end of said flexible shaft and wherein said rotatable drive means is a crankshaft of said engine;

an adaptor removably connecting said one end of said flexible shaft to said rotatable drive means, said adaptor including a main body with an internally threaded end portion removably threaded onto said top end of said rotatable drive means and an opposite end releaseably connected to said one end of said flexible shaft.

* * * * *